United States Patent Office 3,041,376
Patented June 26, 1962

3,041,376
BIS-MALEAMIDES AND A PROCESS FOR THEIR PREPARATION
Carol K. Sauers, Middlebush, and Robert J. Cotter, New Brunswick, N.J., assignors to Union Carbide Corporation, a corporation of New York
No Drawing. Filed May 24, 1960, Ser. No. 31,257
16 Claims. (Cl. 260—562)

This invention relates to bis-maleamides and to a process for their preparation.

The bis-maleamides of the present invention are prepared by reacting an organic amine having at least one hydrogen atom attached to each nitrogen atom with an N-substituted isomaleimide having the general formula:

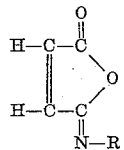

in which R is either a monovalent hydrocarbon radical or a divalent hydrocarbon radical having as a substituent on its terminal carbon atom a radical having the formula:

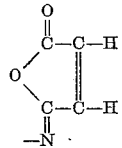

These latter N-substituted isomaleimides are commonly referred to as bis-isomaleimides.

The term "monovalent hydrocarbon radical" as used herein refers to substituted radicals as well as to unsubstituted radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl, and the like; aralkyl radicals, such as benzyl, 2-phenylethyl, 3-phenyl-n-propyl, 1-phenyl-n-butyl, 1-phenyl-n-docesyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl; p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in the general formula previously given is a monovalent hydrocarbon radical are the following:

N-methyl isomaleimide,
N-ethyl isomaleimide,
N-n-propyl isomaleimide,
N-allyl isomaleimide,
n-butyl isomaleimide,
N-tertiary butyl isomaleimide,
N-n-hexyl isomaleimide,
N-(2-ethyl-n-hexyl) isomaleimide,
N-n-heptyl isomaleimide,
N-n-nonyl isomaleimide,
N-n-dodecyl isomaleimide,
N-n-docosyl isomaleimide,
N-cyclohexyl isomaleimide,
N-(2-chloroethyl) isomaleimide,
N-(2-bromoethyl) isomaleimide,
N-(2-fluoroethyl) isomaleimide,
N-(2-iodo-n-propyl) isomaleimide,
N-(2-chloro-n-hexyl) isomaleimide,
N-methoxymethyl isomaleimide,
N-benzyl isomaleimide,
N-(2-phenylethyl) isomaleimide,
N-(3-phenyl-n-propyl) isomaleimide,
N-(4-phenyl-n-butyl) isomaleimide,
N-phenyl isomaleimide,
N-naphthyl isomaleimide,
N-(o-chlorophenyl) isomaleimide,
N-(m-bromophenyl) isomaleimide,
N-(p-fluorophenyl) isomaleimide,
N-(o-iodophenyl) isomaleimide,
N-(o-methoxyphenyl) isomaleimide,
N-(m-methoxyphenyl) isomaleimide,
N-(p-ethoxyphenyl) isomaleimide,
N-(p-n-butoxyphenyl) isomaleimide,
N-(p-chloro-m-methylphenyl) isomaleimide,
N-(o-methylphenyl) isomaleimide,
N-(m-methylphenyl) isomaleimide,
N-(o-ethylphenyl) isomaleimide,
N-(m-ethylphenyl) isomaleimide,
N-(p-ethylphenyl) isomaleimide,
N-(o-isopropylphenyl) isomaleimide,
N-(m-isopropylphenyl) isomaleimide,
N-(p-isopropylphenyl) isomaleimide,
N-(o-n-butylphenyl) isomaleimide,
N-(m-n-butylphenyl) isomaleimide,
N-(4-hydroxy-2-naphthyl) isomaleimide,
N-(4-hydroxy-1-naphthyl) isomaleimide, and the like.

The term "divalent hydrocarbon radical" as used herein is intended to encompass both unsubstituted as well as substituted divalent hydrocarbon radicals. Illustrative of suitable radicals are alkylene radicals, such as ethylene, trimethylene, tetramethylene, pentamethylene, hexamethylene, 2-ethyl hexamethylene, octamethylene, nonamethylene, decamethylene, and the like; the cycloaliphatic radicals, such as 1,4-cyclohexane, 1,3-cyclohexane, 1,2-cyclohexane, and the like; halogenated alkylene and cycloaliphatic radicals, such as 2-chloroethylene, 2-bromoethylene, 2-fluoroethylene, 2-iodoethylene, 2-chlorotrimethylene, 2-bromotrimethylene, 2-chloropentamethylene, 3-chlorohexamethylene, 2-chlorooctamethylene, and the like; alkoxy and aryloxy substituted alkylene and cycloaliphatic radicals, such as methoxy methylene, ethoxy methylene, ethoxy ethylene, 2-ethoxytrimethylene, 3-ethoxy pentamethylene, 1,4-(2-methoxy cyclohexane), phenoxy ethylene, 2-phenoxy trimethylene, 1,3-(2-phenoxy cyclohexane), and the like; aralkylene radicals, such as phenyl ethylene, 2-phenyl trimethylene, 1-phenyl pentamethylene, 2-phenyl decamethylene, and the like; aromatic radicals, such as phenylene, naphthylene, and the like; halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene), and the like.

Among N-substituted isomaleimides wherein R in the formula previously noted is a divalent hydrocarbon radical having as a substituent on its terminal carbon atom a radical having the formula:

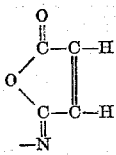

can be noted

N,N'-ethylene bis-isomaleimide,
N,N'-trimethylene bis-isomaleimide,
N,N'-tetramethylene bis-isomaleimide,
N,N'-decamethylene bis-isomaleimide,
N,N'-(1,4-cyclohexane) bis-isomaleimide,
N,N'-(2-chlorotrimethylene) bis-isomaleimide,
N,N'-(2-bromotrimethylene) bis-isomaleimide,
N,N'-(2-chlorotetramethylene) bis-isomaleimide,
N,N'-(3-chlorohexamethylene) bis-isomaleimide,
N,N'-(2-ethoxytetramethylene) bis-isomaleimide,
N,N'-(1-ethoxytetramethylene) bis-isomaleimide,
N,N'-[1,4-(2-methoxycyclohexane)] bis-isomaleimide,
N,N'-(2-phenoxyethylene) bis-isomaleimide,
N,N'-(2-phenoxytrimethylene) bis-isomaleimide,
N,N'-[1,4-(2-phenoxycyclohexane)] bis-isomaleimide,
N,N'-[1,4-(2-nitrocyclohexane)] bis-isomaleimide,
N,N'-phenylethylene bis-isomaleimide,
N,N'-(2-phenylethylene) bis-isomaleimide,
N,N'-(2-phenyltrimethylene) bis-isomaleimide,
N,N'-(2-phenyltetramethylene) bis-isomaleimide,
N,N'-(1-phenyldodecamethylene) bis-isomaleimide,
N,N'-(1,4-phenylene) bis-isomaleimide,
N,N'-(1,5-naphthalene) bis-isomaleimide,
N,N'-[1,4-(2-chlorophenylene)] bis-isomaleimide,
N,N'-[1,4-(2-bromophenylene)] bis-isomaleimide,
N,N'-[1,4-(2-methoxyphenylene)] bis-isomaleimide,
N,N'-[1,4-(2-ethoxyphenylene)] bis-isomaleimide,
N,N'-[1,4-(2-phenoxyphenylene)] bis-isomaleimide,
N,N'-[1,4-(2-methylphenylene)] bis-isomaleimide,
N,N'-[1,4-(2-ethylphenylene)] bis-isomaleimide,
N,N'-(4,4'-diphenyl methane) bis-isomaleimide,
N,N'-(4,4'-diphenylether) bis-isomaleimide,
N,N'-[1,4-(2-n-dodecylphenylene)] bis-isomaleimide,
N,N'-(4,4'-benzophenone) bis-isomaleimide, and the like.

Particularly desirable compounds for purposes of this invention are those wherein R is either a monovalent or divalent radical as previously described having a maximum of 20 carbon atoms and being free of interfering groups, i.e., —COOH and NH₂.

N-substituted isomaleimides can be conveniently produced by reacting an N-substituted maleamic acid having the general formula:

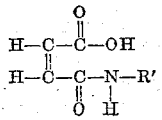

wherein R' is a hydrocarbon radical as defined for R, with a carbodiimide having the general formula:

$$R^2\!-\!N\!=\!C\!=\!N\!-\!R^3$$

wherein $R^2$ and $R^3$ are hydrocarbon radicals. The preparation of N-substituted isomaleimides is described in detail in our copending application Serial No. 851,029 filed November 5, 1959, which is incorporated herein by reference.

The bis-maleamides of the present invention have the general formula:

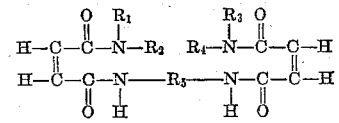

wherein $R_1$, $R_2$, $R_3$, and $R_4$ are monovalent hydrocarbon radicals, preferably containing a maximum of 20 carbon atoms and can be the same or different, or hydrogen atoms with the proviso that when $R_1$ and $R_3$ are hydrogen atoms, then $R_2$ and $R_4$ are monovalent hydrocarbon radicals, and $R_5$ is a divalent hydrocarbon radical, preferably containing a maximum of 20 carbon atoms.

In those instances wherein R, in the general formula previously given for the N-substituted isomaleimides, is a monovalent hydrocarbon radical, the organic amine, which is used as a reactant to produce the corresponding bis-maleamide is an organic diamine having at least one hydrogen atom attached to each nitrogen atom. Among such suitable organic diamines are the organic primary and secondary diamines having the general formula:

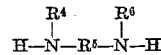

wherein $R^4$ and $R^6$ are hydrogen or monovalent hydrocarbon radicals and $R^5$ is a divalent hydrocarbon radical. $R^4$ and $R^6$ can be the same or different. Illustrative of suitable organic amines are 1,2-diaminoethane,
1,3-diaminopropane,
1,4-diaminobutane,
1,5-diaminopentane,
1,6-diaminohexane,
1,8-diaminooctane,
1,9-diaminononane,
1,10-diaminodecane,
1,4-diaminocyclohexane,
1,4-phenylene diamine,
1,3-phenylene diamine,
1,2-phenylene diamine,
4,4'-diaminodiphenyl methane,
4,4'-diaminodiphenyl,
3,3'-diamino-4,4'-dimethyldiphenyl,
3,3'-diamino-4,4'-dimethoxydiphenyl,
N,N'-dimethylhexamethylene diamine,
N,N'-dimethyl-(2-phenoxy)-trimethylene diamine,
N,N'-dimethyldecamethylene diamine,
N,N'-dimethyl-2-phenyl-decamethylene diamine,
N,N'-dimethyl-3,3'-diaminodiphenyl,
N-methyl-N'-ethyl-hexamethylene diamine,
N-ethyl-N'-n-propyl-1,4-phenylene diamine,
N-phenyl-N'-(3-chloropropyl)-1,4-phenylene diamine,
N-ethyl-N'-(2-phenyl-n-decyl)-butane-1,4-diamine, and like compounds particularly those free of interfering groups, i.e. COOH and OH. Particularly desirable organic diamines for purposes of this invention are those wherein $R^4$ and $R^6$ are hydrogen or monovalent hydrocarbon radicals containing a maximum of 20 carbon atoms and $R^5$ contains a maximum of 20 carbon atoms.

Also suitable are heterocyclic diamines having the general formula:

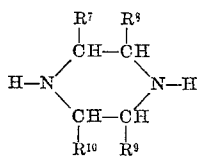

wherein $R^7$, $R^8$, $R^9$, and $R^{10}$ are monovalent hydrocarbon radicals or hydrogen. Suitable monovalent hydrocarbon radicals include, among others, the alkyl radicals, such as methyl, ethyl, n-propyl, n-butyl, isobutyl, and the like; cycloalkyl radicals, such as cyclohexyl and the like; alkyl radicals having cycloalkyl substituents, such as cyclohexylmethyl and the like; aromatic hydrocarbon radicals, such as phenyl and the like. Specific suitable heterocyclics are 2-methyl-piperazine, 2,5-dimethyl-piperazine, 2-phenyl-piperazine, and the like. Particularly desirable piperazines are those wherein $R^7$, $R^8$, $R^9$, and $R^{10}$ which can be the same or different are hydrogen or monovalent hydrocarbon radicals having a maximum of six carbon atoms and being free of interfering groups, i.e., COOH and OH.

The reaction of an organic diamine and an N-substituted isomaleimide can be illustrated by the following equation:

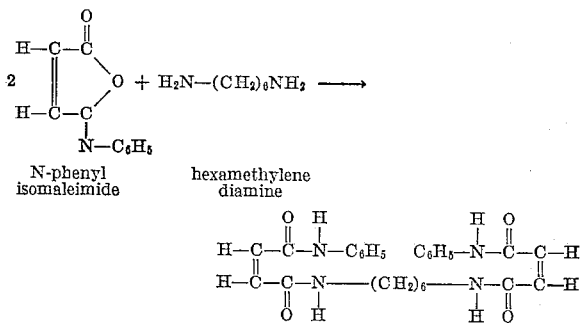

In those instances wherein R in the general formula previously given for the N-substituted isomaleimides is a divalent hydrocarbon radical, the organic amine which is used as a reactant to produce the corresponding bis-maleamide is an organic monoamine having at least one hydrogen atom attached to the nitrogen atom. Illustrative of suitable monoamines are saturated aliphatic primary amines, such as methylamine, ethylamine, isopropylamine, n-butylamine, isobutylamine, isoamylamine, n-hexylamine, n-heptylamine, n-octylamine, n-dodecylamine, 2-chloroethylamine, 2-bromoethylamine, 2-fluoroethylamine, methoxymethylamine, 2-phenoxy-n-propylamine, benzylamine, 2-phenethylamine, 4-phenyl-n-butylamine, and the like; unsaturated, aliphatic primary amines, such as allylamine, and the like; cycloaliphatic primary amines, such as cyclohexylamine, chlorocyclohexylamine, and the like; aromatic primary amines, such as p-toluidine, o-p-xylylidine, o-ethylaniline-m-ethylaniline, p-ethylaniline, o-isopropylaniline, m-isopropylaniline, p-isopropylaniline, o-n-butylaniline, m-n-butylaniline -p-n-butylaniline, p-n-octylaniline, o-chloroaniline, m-bromoaniline, p-fluoroaniline, o-iodoaniline, o-methoxyaniline, m-methoxyaniline, p-ethoxyaniline, p-n-butoxyaniline, o-nitroaniline, p-nitroaniline, 4-chloro-3-methylaniline, 4-sulfamylaniline, and the like; saturated aliphatic secondary amines, such as dimethylamine, diethylamine, di-n-propylamine, di-n-butylamine, and the like; secondary aromatic amines, such as N-methylaniline, N-ethylaniline, and the like; heterocyclic secondary amines, such as piperidine and the like.

Particularly desirable organic monoamines having at least one amino hydrogen atom are those containing a maximum of 20 carbon atoms and being free of interfering groups, i.e., COOH and OH.

The following equation exemplifies the reaction between an organic monoamine and a bis-isomaleimide.

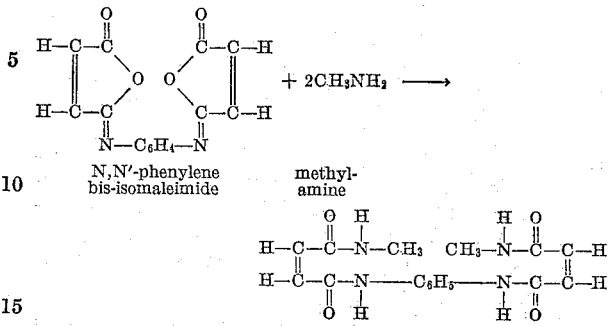

When reacting an organic diamine with an N-substituted isomaleimide, as explained, at least two moles of the N-substituted isomaleimide are used per mole of the organic diamine. In the instance where the N-substituted isomaleimide is a bis-isomaleimide, at least two moles of the organic monoamine is used per mole of the bis-isomaleimide.

The temperature at which the reaction between the N-substituted isomaleimide and the organic amine is conducted can also vary over a wide range, from as low as about 0° C. to a temperature just below the decomposition point of the starting materials and of the bis-maleamide which is to be formed. At temperatures lower than about 0° C., the reaction proceeds sluggishly. A temperature in the range of about 20° C. to about 100° C. is most preferred.

It is also preferred to conduct the reaction between the organic amine and the N-substituted isomaleimide in the presence of an organic diluent which is a solvent for the starting materials and is non-reactive with respect to the starting materials and the final product. The use of an organic diluent facilitates removal of the bis-maleamide from the reaction mixture. The actual organic diluent used will depend upon the starting materials and the temperature at which the reaction is to be conducted. The organic diluent should have a boiling point equal to or above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane, and the like; ethers, such as diethyl ether, diethyl ether of ethylene glycol, diethyl ether of 1,3-propylene glycol, dioxane, and the like; aliphatic ketones, such as acetone, methyl ethyl ketone, and the like; also suitable are dimethyl formamide, petroleum ether, and the like.

The reaction between the N-substituted isomaleimides and the amines is conducted, generally, under atmospheric pressure, although if desired, the reaction can be conducted under subatmospheric or superatmospheric pressure.

The process of the present invention is conducted by simply admixing an N-substituted isomaleimide and an organic amine at the desired temperature. The reaction between the N-substituted isomaleimide and the organic amine to produce the corresponding bis-maleamide is practically instantaneous in that some of the desired maleamide is formed immediately upon admixing the reactants. It is customary, however, to allow the reaction mixture to stand for at least about one hour in order to insure that the reaction has proceeded to completion.

Recovery of the bis-maleamide from the reaction mixture can be accomplished by any one of a number of convenient methods. For example, in those instances wherein the bis-maleamide is a solid, it can be recovered as a filter cake and, if desired, purified by column chromatography in order to insure removal of unreacted materials. Alternatively, the bis-maleamide can be recrystallized from suitable solvents. If the N,N'-disubstituted maleamide is a liquid, it can be recovered as a distillate from the reaction mixture.

The following examples further illustrate the present invention and are not intended to limit the scope thereof in any manner.

EXAMPLE 1

*Preparation of 1,6-Bis[3-(N-Phenylamido)-Propenoylamino]-Hexane*

To 50 ml. of diethyl ether contained in a round bottom flask there was added to and dissolved therein 3.46 grams (0.02 mole) of N-phenyl isomaleimide. To this solution was then added a solution of 1.16 grams (0.01 mole) of hexamethylene diamine in 25 ml. of diethyl ether. A precipitate formed immediately upon the addition of the diamine. The reaction mixture was stirred at room temperature, about 25° C., for 24 hours, filtered, and the solid recovered allowed to dry at about 100° C. for 24 hours. 4.6 grams of the bis-maleamide were recovered.

Calculated: percent nitrogen—12.12
Found: percent nitrogen—11.8

Infra-red analysis also confirmed the structure of the product to be:

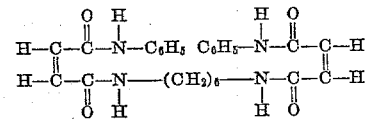

EXAMPLE 2

*Preparation of 1,6-Bis[3-(N-Phenylamido)-Propenoylamino]-Hexane*

TO 50 ml. of diethyl ether contained in a round bottom flask, there was added to and dissolved therein 2.76 grams (0.01 mole) of N,N'-hexamethylene-bis-isomaleimide. To this solution was then added a solution of 1.86 grams (0.02 mole) of aniline in 25 ml. of diethyl ether. A precipitate formed immediately upon the addition of the monoamine. The reaction mixture was stirred at room temperature, about 25° C., for 24 hours, filtered, and the solid product recovered, allowed to dry at about 100° C. for 24 hours.

3.5 grams of the bis-maleamide were recovered.

Infra-red analysis also confirmed the structure of the product to be:

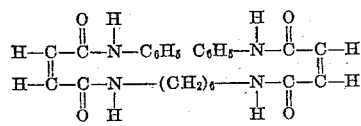

The bis-maleamides of the present invention have particular utility as monomers which can be polymerized with an alpha pyrone to produce thermoplastic polymers. For instance, the bis-maleamide of Example 1 can be polymerized with equimolar amounts of 4,6-dimethyl-5-carbethoxyalpha pyrone by heating a mixture of the two at reflux in a flask containing bromobenzene for about 72 hours. The polymer so produced can be cast into film material which can be used for wrapping toys and other such articles. Other pyrones with which the products of the invention can be polymerized are enumerated in U.S. 2,890,207 which is incorporated herein by reference.

The monomers of the present invention can also be used as comonomers in vinyl polymerizations as described in U.S. 2,790,784 and 2,794,793. Furthermore, the monomers find utility in agricultural uses as weed control agents.

What is claimed is:

1. A bis-maleamide having the formula:

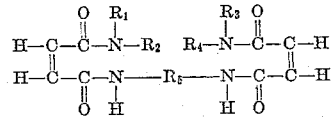

wherein $R_1$, $R_2$, $R_3$ and $R_4$ are selected from the group consisting of monovalent hydrocarbon radicals having a maximum of 20 carbon atoms and hydrogen atoms, and $R_5$ is a divalent hydrocarbon radical having a maximum of 20 carbon atoms, with the further limitation that when $R_1$ and $R_3$ are hydrogen atoms then $R_2$ and $R_4$ are monovalent hydrocarbon radicals having a maximum of 20 carbon atoms.

2. A bis-maleamide as defined in claim 1 wherein $R_5$ is an alkylene radical having a maximum of 20 carbon atoms.

3. A bis-maleamide as defined in claim 1 wherein $R_2$ and $R_4$ are alkyl radicals having a maximum of 20 carbon atoms.

4. A bis-maleamide as defined in claim 1 wherein $R_2$ and $R_4$ are alkyl radicals having a maximum of 20 carbon atoms and $R_5$ is an alkylene radical having a maximum of 20 carbon atoms.

5. A bis-maleamide as defined in claim 1 wherein $R_5$ is the hexamethylene radical.

6. A bis-maleamide as defined in claim 1 wherein $R_2$ and $R_4$ are phenyl radicals.

7. The bis-maleamide 1,6-bis[3-(N-phenylamido)-propenoylamino]-hexane.

8. Process for the preparation of a bis-maleamide which comprises reacting a mixture containing an N-substituted isomaleimide having the formula:

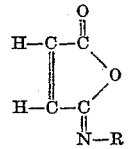

wherein R is selected from the group consisting of monovalent hydrocarbon radicals and divalent hydrocarbon radicals having as a substituent on their terminal carbon atoms a radical having the formula:

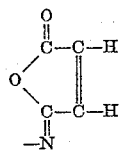

said monovalent hydrocarbon radicals and said divalent hydrocarbon radicals having a maximum of 20 carbon atoms, with an organic amine having at least one hydrogen atom attached to each nitrogen atom, and in the instance wherein R is a monovalent hydrocarbon radical, the amine is an organic diamine with the N-substituted isomaleimide being present in an amount of at least two moles per mole of diamine and in the instance wherein R is a divalent hydrocarbon radical, the amine is an organic monoamine with the organic monoamine being present in an amount of at least two moles per mole of the N-substituted isomaleimide.

9. Process as defined in claim 8 wherein the mixture contains an organic diluent.

10. Process as defined in claim 8 wherein the reaction is conducted at a temperature of about 20° C. to about 100° C.

11. Process as defined in claim 8 wherein the organic amine is hexamethylene diamine.

12. Process as defined in claim 8 wherein the organic amine is aniline.

13. Process as defined in claim 8 wherein the N-substituted isomaleimide is N-phenyl isomaleimide.

14. Process as defined in claim 8 wherein the N-substituted isomaleimide is N,N'-hexamethylene-bis-isomaleimide.

15. Process for the preparation of a bis-maleamide which comprises reacting in an organic diluent and at temperatures of about 0° C. to a temperature below the decomposition point of the starting materials and of the bis-maleamide which is to be formed, an N-substituted isomaleimide having the formula:

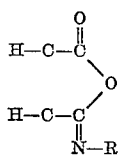

wherein R is selected from the group consisting of monovalent hydrocarbon radicals and divalent hydrocarbon radicals having as a substituent on their terminal carbon atoms a radical having the formula:

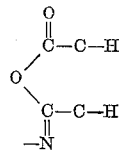

said monovalent hydrocarbon radicals and said divalent hydrocarbon radicals having a maximum of 20 carbon atoms, with an organic amine having at least one hydrogen atom attached to each nitrogen atom, and in the instance wherein R is a monovalent hydrocarbon radical, the amine is an organic diamine with the N-substituted isomaleimide being present in an amount of at least two moles per mole of diamine and in the instance wherein R is a divalent hydrocarbon radical, the amine is an organic monoamine with the organic monoamine being present in an amount of at least two moles per mole of the N-substituted isomaleimide.

16. Process as defined in claim 15 wherein the organic diamine has the formula:

$$H-\overset{R^4}{\underset{|}{N}}-R^5-\overset{R^6}{\underset{|}{N}}-H$$

wherein $R^4$ and $R^6$ are members selected from the group consisting of hydrogen and monovalent hydrocarbon radicals having a maximum of 20 carbon atoms and $R^5$ is a divalent hydrocarbon radical having a maximum of 20 carbon atoms.

No references cited.